United States Patent
Syed et al.

(10) Patent No.: US 6,539,217 B1
(45) Date of Patent: Mar. 25, 2003

(54) METHODS AND ARRANGEMENTS FOR USE IN MOBILE COMMUNICATION NETWORKS SPANNING MULTIPLE TIME-ZONES

(75) Inventors: Inayat Syed, Fairfax, VA (US); Martin Reichelt, Plano, TX (US); Nauman Shakil, Plano, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/412,045

(22) Filed: Oct. 4, 1999

(51) Int. Cl.[7] .............................................. H04M 11/00
(52) U.S. Cl. ...................... 455/406; 455/407; 455/408; 455/456
(58) Field of Search ................................ 455/406, 427, 455/432, 456, 405, 407, 408, 430

(56) References Cited

U.S. PATENT DOCUMENTS

| | | | | |
|---|---|---|---|---|
| 5,673,256 A | * | 9/1997 | Maine ..................... | 340/825.49 |
| 5,784,442 A | * | 7/1998 | Foti ............................ | 455/403 |
| 6,075,992 A | * | 6/2000 | Moon et al. ................. | 455/455 |
| 6,138,008 A | * | 10/2000 | Dunn et al. .................. | 455/414 |
| 6,157,823 A | * | 12/2000 | Fougnies et al. ......... | 379/114.2 |
| 6,198,915 B1 | * | 3/2001 | McGregor et al. ........... | 455/406 |
| 6,223,050 B1 | * | 4/2001 | Roberts, Jr. ................... | 368/47 |
| 6,253,072 B1 | * | 6/2001 | Verdonk ....................... | 455/405 |
| 6,256,504 B1 | * | 7/2001 | Tell et al. .................... | 455/403 |
| 6,393,263 B1 | * | 5/2002 | Hayashi ....................... | 455/145 |

FOREIGN PATENT DOCUMENTS

| WO | 2742952 | 6/1997 |
| WO | WO98/21873 | 5/1998 |

* cited by examiner

Primary Examiner—Dwayne Bost
Assistant Examiner—Lewis West
(74) Attorney, Agent, or Firm—Jenkens & Gilchrist, P.C.

(57) ABSTRACT

Methods and arrangements are provided for use in a mobile communications network to determine an appropriate tariff for a mobile station accessing the capabilities of a mobile communications network having a coverage area that extends over a plurality of time-zone, borders, and/or other cost/service-sensitive regions. A time stamp is used, which includes an offset value associated with the location of the mobile station accessing the mobile communication services, to more precisely and efficiently determine an appropriate tariff to be charged, and/or service to be rendered to the subscriber associated with the mobile station. The methods and arrangements are particularly useful in mobile communication networks having satellite nodes.

29 Claims, 2 Drawing Sheets

METHODS AND ARRANGEMENTS FOR USE IN MOBILE COMMUNICATION NETWORKS SPANNING MULTIPLE TIME-ZONES

BACKGROUND OF THE INVENTION

1. Technical Field of the Invention

The present invention relates to mobile communications, and, more particularly, to methods and arrangements for efficiently determining the proper time and tariff associated with a mobile station operating in a mobile communications network that is capable of providing communication services to one or more areas that are located within a plurality of different time-zones.

2. Description of Related Art

Mobile communications systems, such as, for example, a Global System for Mobile (GSM) communications system, are typically designed to provide communication services to subscribers located a fairly large coverage region, that has been subdivided into a plurality of cells. Typically, these cells are located within certain distinct and known time-zones, and the services associated with the mobile communication system are tied to the time of day within the cell from which the subscriber places the call.

Often, the mobile communication network informs the mobile station of the tariffs or other charges associated with the requested/continuing call. In this manner, the subscriber is made aware of the costs associated with the call. In the past this additional feature has been fairly easy to provide, because the mobile switching center is usually located nearby the mobile station, and typically within the same time-zone. Additional tariff related features/issues, concern borders, for example between countries, etc. Here, there can also be a need to make further adjustments to the estimated tariff information provided to the mobile station for display to the subscriber. As is often the problem, the estimated tariff provided to the subscriber in near real-time can differ significantly from the actual post-processed tariff mailed at a later time to the subscriber. One reason for this is that the time associated with the location of the mobile station is not always immediately determinable for use in the estimate calculation.

Recent developments have brought about a more expansive mobile communications system capability. In particular, satellites are being introduced to provide even wider area coverage for mobile stations. Accordingly, the coverage areas provided by a high orbit satellite (e.g., geosynchronous orbit) can be so large that multiple time-zones are crossed, and/or multiple countries/region borders are included for coverage.

Consequently, there is a need for improved methods and arrangements that can be employed to determine an accurate tariff based on the location of the mobile station. Preferably, the estimated tariff and post processed tariff will substantially match one another.

Another advantage of the instant invention is in pre-paid phone services where the timely calculation of tariff is critical.

SUMMARY OF THE INVENTION

The various methods and arrangements in accordance with the present invention can be easily employed to determine an accurate tariff based on the location of the mobile station, where the estimated tariff and post processed tariff substantially match one another.

The above needs and others are met by a method for use in mobile telecommunication systems. The method includes the steps of establishing a reference time, determining an offset for a mobile station with respect to the reference time, and determining a cost associated with a call connection to the mobile station based on a tariff associated with a local time that is determined using the reference time and the offset time. For example, in certain embodiments, the reference time is Greenwich Mean Time (GMT) or Global Positioning Satellite (GPS) time, and the offset is determined by the mobile station based on its current geographical location with respect to the reference time. In other embodiments, the offset is provided to a post processing unit, after having passed through a satellite, a base station and/or a mobile switching center.

An arrangement is also provided, which includes a mobile station that is configured to determine a offset with respect to a current determined location and a reference time. The mobile station transmits the offset to at least one satellite, which in-turn provides the offset to at least one ground node that is configured to determine a cost associated with a call connection to the mobile station based on a tariff associated with a local time that is determined using the reference time and the offset time.

Consequently, the mobile communication system can be provided with the capability to determine the costs associated with a call placed by a subscriber more quickly and accurately.

BRIEF DESCRIPTION OF THE DRAWINGS

A more complete understanding of the various methods and arrangements of the present invention may be obtained by reference to the following Detailed Description when taken in conjunction with the accompanying Drawings wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
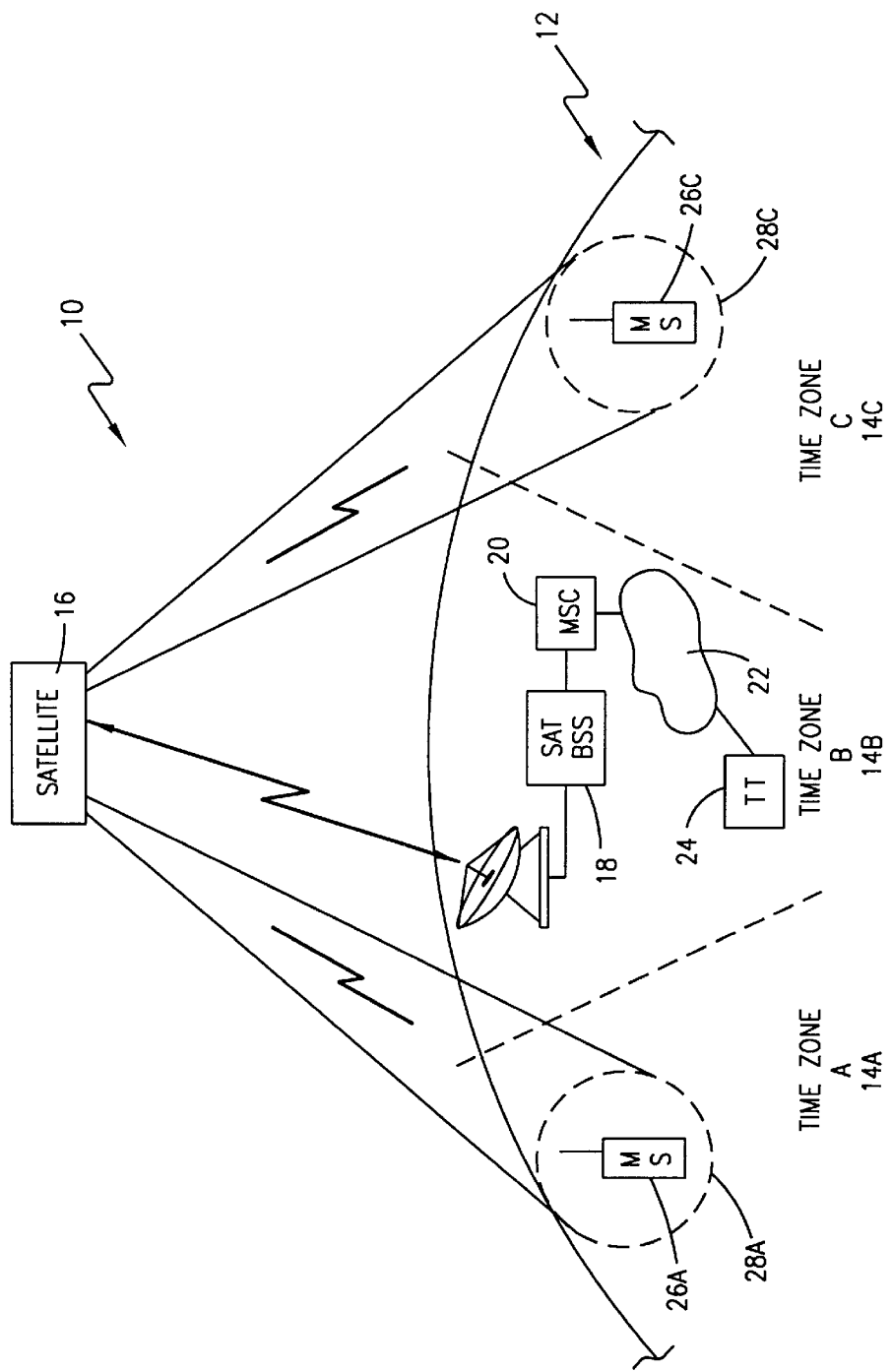
FIG. 1 is a block diagram depicting an exemplary arrangement of a mobile communications network in accordance with certain embodiments of the present invention.

FIG. 1 is a block diagram depicting an exemplary arrangement for a mobile communications network 10. Mobile communications network 10 is configured to provide coverage over a significantly large region 12 that includes, for example, three distinct time-zones, namely time zone A, time zone B and time zone C, respectively designated by the reference identifiers 14A, 14B and 14C. These time zones could further represent different tariff zones, countries, etc. A satellite 16 is provided, preferably in a geosynchronous orbit over region 12 and configured to provided uplink and downlink communication services to mobile stations located within the coverage area of mobile communications network 10. By way of example, satellite 16 can provide spot beam coverage to selected portions or cells within each of the three time zones 14A–C. Thus, as shown, a spot beam defined as cell 28A is depicted in time zone A (14A). Within cell 28A there is a mobile station (MS) 26A that is configured to communicate with satellite 16. Similarly, there is another spot beam defined as cell 28C depicted in time zone C (14C). Here, within cell 28C there is another mobile station (MS) 26C that is also configured to communicate with satellite 16. Finally, within time zone B (14B), there is a satellite base station subsystem (BSS) 18 that is configured to send uplink signals to satellite 16 and downlink signals from satellite 16. Satellite BSS 18 is further connected to a mobile switching center (MSC) 20, which is configured to complete call connections through one or more external networks, generally designated by the reference numeral 22, with at least one telecommunications terminal (TT) 24.

There is a need to differentiate the local times for calls placed in these various time zone, particularly, when tariffs and/or features correspond to the location and/or time during which access to the communications services is made.

Thus, for example, MS 26A may be charged at a premium rate for calls make during a prescribed time, while further away, the rates for MS 26C are discounted because of the local time difference.

BSS 18 is connected to a mobile switching center (MSC) 20. MSC 20 can be configured to provide connectivity through at least one fixed network 22, such as, for example, a public switched telephone network (PSTN), to a remote telecommunications terminal (TT) 24. In this manner calls can be connected between MS 26A, 26B and/or TT 24, using satellite 16, BSS 18, MSC 20 and network 22.

As graphically depicted in FIG. 1, satellite 16 utilizes spot beam technologies to differentiate between selected regions or cells.

Figure 2:
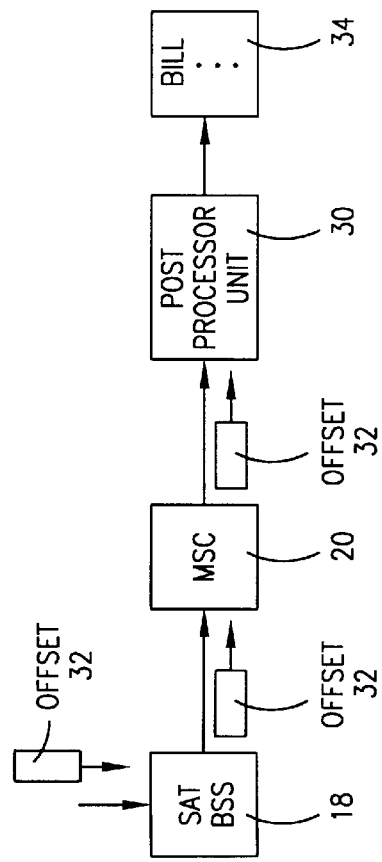
FIG. 2 is a block diagram of a portion of the mobile communications network illustrated in FIG. 1 in accordance with certain embodiments of the present invention.

With reference now to FIG. 2, there is illustrated is a block diagram depicting a portion of a mobile communications network that is concerned with determining the cost and/or services associated with a mobile station operating in the coverage areas in FIG. 1. Here, BSS 18 is configured to receive signals and data from satellite 16. For example, in certain embodiments, BSS 18 receives an offset 32 from MS 26A via satellite 16. Offset 32 identifies how far away, physically, the MS is from a particular reference that is used to calculate the costs and services available to the subscriber as currently located. Thus, for example, offset 32 can include a time value that is associated with the difference in time from the time zone in which the MS is currently located in and the reference time. In certain cases, therefore, the offset from MS 26A might be −1, which indicates that time zone 14A is one hour slower than the reference time that happens to be that of time zone 14B. In other examples, offset 32 reflects the difference between a universal time standard, such as, for example, GMT or GPS time.

The received offset 32 is then forwarded to MSC 20, which in turn provides offset 32 or a portion thereof to a post processing unit 30. Post processing unit 30 is configured to generate a bill 34 or similar invoice for the communication services provided, for example, based on the offset, the call duration, the selected features, the type of call, the called party, the time of day/night, the day of the week, certain taxes, the bandwidth required, etc.

In accordance with still other embodiments of the present invention, MS 26A, for example, need not provide offset 32 to BSS 18, but can rather provide a location identifier to BSS 18. BSS 18 can then generate an offset 32 using the MS location identifier to determine the appropriate zone form the MS. Thus, BSS 18 can generate and provide offset 32 to MSC 20.

Similarly, in accordance with still further embodiments of the present invention, MS 26A, for example, need not provide offset 32 to BSS 18, but can rather provide a location identifier to BSS 18. BSS 18 can pass this location identification on to MSC 20. MSC 20 can then generate an offset 32 using the MS location identifier to determine the appropriate zone form the MS. Thus, MSC 20 can generate and provide offset 32 to post processing unit 30.

Location identifier information can be determined by MS 26A using several known techniques, including, for example, GPS positioning data, beacon triangulation/arcuation gathered data, etc. Furthermore, a more granular locations identifier can be determined by identifying the slot beam or cell associated with satellite 16.

Figure 3:
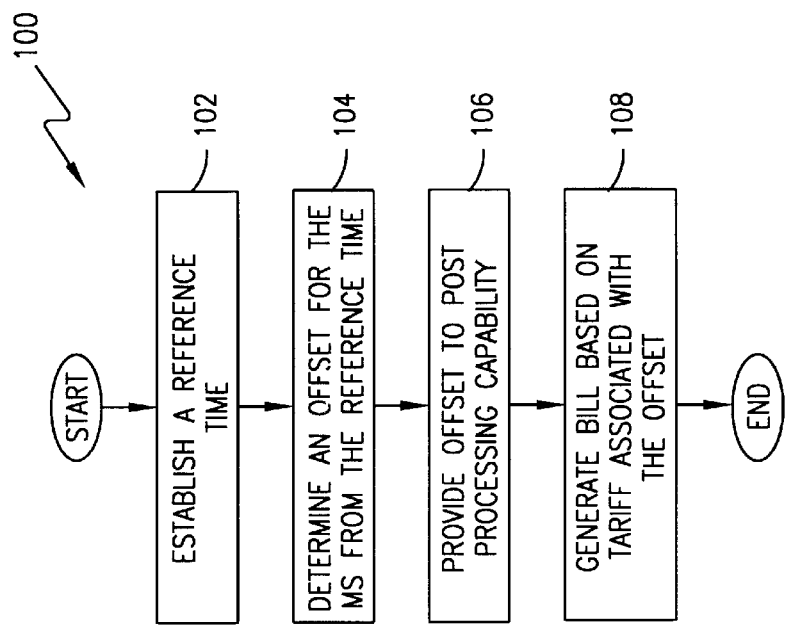
FIG. 3 is a flow-chart depicting an exemplary process for generating a bill based on a time offset within a mobile communication network in accordance with certain embodiments of the present invention.

With this in mind, shown in FIG. 3 is a flow chart depicting a process 100 for using an offset value in a mobile communications network to determine applicable tariffs and/or services to be provided to a MS.

In step 102, a reference time is determined or otherwise established. The reference time can be a global standard time, or a time associated with the time zone encompassing BSS 18, MSC 20, etc. In step 104, an offset 32 is determined for the MS based on its location with respect to the reference time established in step 102. Next, in step 106, the offset is provided to a post processing capability 30. In step 108, post processing capability 30 determines and generates a bill associated with the communication service provided to the subscriber of the MS based on the time zone or location of the MS in accordance with the referenced time and offset 32. In accordance with certain aspects of the present invention, the above described offset evaluation process tends to make the estimated costs displayed at the MS, substantially match the actual billed costs as determined subsequently by post processor unit 30.

As discussed, the principles of the present invention may also be used in pre-paid phone services where the timely calculation of a tariff is important. As is understood in the art, this pre-paid service may be Intelligent Network-based or non-IN based.

The previous description is of preferred embodiments for implementing the invention, and the scope of the invention should not necessarily be limited by this description. The scope of the present invention is instead defined by the following claims.

What is claimed is:

1. A method for use in mobile telecommunication systems, the method comprising the steps of:
   establishing a reference time associated with a geographical coverage area of a mobile communication network;
   determining an offset identifying a time value associated with a difference in time between a local time at a current location of a mobile station within the geographical coverage area of the mobile communication network and the reference time; and
   determining a cost associated with a call connection to the mobile station based on a tariff associated with the local time using the offset.

2. The method as recited in claim 1, wherein the reference time is Greenwich Mean Time (GMT).

3. The method according to claim 1, wherein the reference time is Global Positioning Satellite (GPS) time.

4. The method according to claim 1, wherein the step of determining the offset is performed within the mobile station.

5. The method according to claim 4, wherein the step of determining the offset in the mobile station further includes determining a geographical location of the mobile station.

6. The method according to claim 5, wherein the step of determining the cost associated with the call connection further includes providing the offset to a post processing unit.

7. The method according to claim 6, wherein the step of providing the offset to a post processing unit further includes relaying the offset through at least one satellite.

8. The method according to claim 6, wherein the step of providing the offset to a post processing unit further includes sending the offset from a base station.

9. The method according to claim 6, wherein the step of providing the offset to a post processing unit further includes sending the offset from a mobile switching center.

10. The method according to claim 1, wherein said cost is associated with a pre-paid service.

11. The method according to claim 1, wherein the geographical coverage area is a mobile switching center service area.

12. The method according to claim 1, wherein the geographical coverage area is a satellite coverage area.

13. An arrangement for use in a mobile communication network, the arrangement comprising:
    a mobile station configured to determine an offset identifying a time value associated with a difference in time between a local time at a current determined location of the mobile station within a geographical coverage area of the mobile communication network and a reference time associated with the geographical coverage area of the mobile communication network, and transmit the offset;
    at least one satellite, configured to receive the offset from the mobile station and retransmit the offset; and
    at least one ground node configured to receive the retransmitted offset from the satellite and determine a cost associated with a call connection to the mobile station based on a tariff associated with the local time using the offset.

14. The arrangement according to claim 13, wherein the reference time is Greenwich Mean Time (GMT).

15. The arrangement according to claim 13, wherein the reference time is Global Positioning Satellite (GPS) time.

16. The arrangement according to claim 13, wherein the mobile station determines the offset by determining a geographical location of the mobile station.

17. The arrangement according to claim 13, wherein the ground node includes at least one base station, at least one mobile switching center, and at least one post processing unit.

18. The arrangement according to claim 13, wherein said cost is associated with a pre-paid service.

19. The arrangement according to claim 16, wherein the geographical location of the mobile station is determined using Global Positioning System data.

20. A processing unit for use by a mobile communication network, comprising:
    means for receiving an offset identifying a time value associated with a difference in time between a local time at a current location of a mobile station within a geographical coverage area of the mobile communication network and a reference time associated the geographical coverage area of the mobile communication network; and
    means for determining a cost associated with a call connection to the mobile station based on a tariff associated with the local time using the offset.

21. The processing unit according to claim 20, further comprising:
    means for generating a bill for the call connection, the bill having the determined cost therein.

22. A network node in wireless communication with a mobile station within a mobile communication network, comprising:
    means for determining a reference time associated with a geographical coverage area of the mobile communication network;
    means for receiving a location identifier identifying a current location of the mobile station within the geographical coverage area of the mobile communication network; and
    means for determining an offset identifying a time value associated with a difference in time between a local time at a current location of a mobile station within a geographical coverage area of the mobile communication network and a reference time associated with the geographical coverage area of the mobile communication network, the offset being used to determine a cost associated with a call connection to the mobile station based on a tariff associated with the local time.

23. A telecommunication system, comprising:
    a mobile station within a geographical coverage area of a mobile communication network for determining a location identifier identifying a current location of the mobile station;
    a network node in wireless communication with the mobile station for receiving the location identifier from the mobile station, the network node being further configured to determine an offset identifying a time value associated with a difference in time between a local time at the current location of the mobile station and a reference time associated with the geographical coverage area of the mobile communication network using the location identifier; and means for determining a cost associated with a call connection to the mobile station based on a tariff associated with the local time using the offset.

24. The telecommunications system according to claim 23, further comprising:

a base station system in wireless communication with the mobile station.

25. The telecommunications system according to claim 24, wherein the network node is the base station system.

26. The telecommunications system according to claim 24, further comprising:

mobile switching center in wireless communication with the mobile station via the base station system, the network node being the mobile switching center.

27. The telecommunications system according to claim 26, wherein the geographical coverage area is a service area of the mobile switching center.

28. The telecommunications system according to claim 23, wherein the geographical coverage area is a satellite coverage area.

29. An arrangement for use in a mobile communication network, comprising:

a mobile station within a geographical coverage area of the mobile communication network for displaying an estimated cost for a call connection to the mobile station;

means for determining an offset identifying a time value associated with a difference in time between a local time at a current location of the mobile station and a reference time associated with the geographical coverage area of the mobile communication network; and a processing unit for determining an actual cost associated with the call connection to the mobile station based on a tariff associated with the local time using the offset, the actual cost being substantially equivalent to the estimated cost.

* * * * *